(12) United States Patent
Dejneka et al.

(10) Patent No.: US 12,091,353 B2
(45) Date of Patent: Sep. 17, 2024

(54) ARTICLES INCLUDING GLASS AND/OR GLASS-CERAMIC AND METHODS OF MAKING THE SAME

(71) Applicant: CORNING INCORPORATED, Corning, NY (US)

(72) Inventors: Matthew John Dejneka, Corning, NY (US); Jesse Kohl, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/288,890

(22) PCT Filed: Apr. 26, 2022

(86) PCT No.: PCT/US2022/026278
§ 371 (c)(1),
(2) Date: Oct. 30, 2023

(87) PCT Pub. No.: WO2022/235450
PCT Pub. Date: Nov. 10, 2022

(65) Prior Publication Data
US 2024/0208856 A1 Jun. 27, 2024

Related U.S. Application Data

(60) Provisional application No. 63/183,161, filed on May 3, 2021.

(51) Int. Cl.
*B32B 3/02* (2006.01)
*B32B 17/10* (2006.01)
(Continued)

(52) U.S. Cl.
CPC .... *C03C 10/0054* (2013.01); *B32B 17/10036* (2013.01); *B32B 17/10119* (2013.01);
(Continued)

(58) Field of Classification Search
CPC ......... B32B 17/10036; B32B 17/10119; B32B 17/10128; B32B 17/10293; B32B 17/10339
See application file for complete search history.

(56) References Cited

U.S. PATENT DOCUMENTS 3,788,865 A 1/1974 Busdiecker et al.
4,240,836 A 12/1980 Borrelli et al.
(Continued)

FOREIGN PATENT DOCUMENTS

WO 2018/015312 A1 1/2018
WO 2018/015313 A1 1/2018
(Continued)

OTHER PUBLICATIONS

International Search Report and Written Opinion of the International Searching Authority; PCT/US2022/026278; mailed on Jul. 28, 2022, 11 pages; European Patent Office.

*Primary Examiner* — Elizabeth E Mulvaney
(74) *Attorney, Agent, or Firm* — William M. Johnson; Russell S. Magaziner

(57) ABSTRACT

Glazing, such as for vehicles, includes a sheet of glass-ceramic that has different regions with different transmission properties, including a first visually clear region that blocks infrared, a second visually clear region that allows transmission of infrared, and a third colored region.

20 Claims, 9 Drawing Sheets

(51) Int. Cl.
*C03B 23/025* (2006.01)
*C03C 3/091* (2006.01)
*C03C 3/093* (2006.01)
*C03C 10/00* (2006.01)
*C03C 23/00* (2006.01)

(52) U.S. Cl.
CPC .. *B32B 17/10128* (2013.01); *B32B 17/10293* (2013.01); *B32B 17/10339* (2013.01); *B32B 17/10889* (2013.01); *C03B 23/0258* (2013.01); *C03C 3/091* (2013.01); *C03C 3/093* (2013.01); *C03C 23/0025* (2013.01); *C03C 23/007* (2013.01); *B32B 2250/40* (2013.01); *B32B 2307/402* (2013.01); *B32B 2307/412* (2013.01); *B32B 2310/0843* (2013.01); *B32B 2315/08* (2013.01); *B32B 2605/08* (2013.01); *C03C 2204/00* (2013.01)

(56) References Cited

U.S. PATENT DOCUMENTS

| | | |
|---|---|---|
| 5,622,580 A | 4/1997 | Mannheim |
| 6,048,621 A | 4/2000 | Gallego et al. |
| 6,506,487 B2 | 1/2003 | Nagai |
| 6,911,254 B2 | 6/2005 | Fisher et al. |
| 8,053,079 B2 | 11/2011 | Aoki |
| 8,227,079 B2 | 7/2012 | Torr et al. |
| 8,421,011 B2 | 4/2013 | Melcher et al. |
| 9,403,716 B2 | 8/2016 | Dejneka et al. |
| 10,246,371 B1 | 4/2019 | Dejneka et al. |
| 10,370,291 B2 | 8/2019 | Dejneka et al. |
| 10,450,220 B2 | 10/2019 | Dejneka et al. |
| 10,464,840 B2 | 11/2019 | Annamalai et al. |
| 10,829,408 B2 | 11/2020 | Dejneka et al. |
| 10,870,906 B2 | 12/2020 | Leoni et al. |
| 2017/0362119 A1 | 12/2017 | Dejneka et al. |
| 2017/0369003 A1 | 12/2017 | Williams et al. |
| 2018/0036839 A1 | 2/2018 | Estinto et al. |
| 2019/0177206 A1 | 6/2019 | Dejneka et al. |
| 2019/0177209 A1 | 6/2019 | Dejneka et al. |
| 2019/0177211 A1 | 6/2019 | Dejneka et al. |
| 2019/0177212 A1 | 6/2019 | Dejneka et al. |
| 2019/0256408 A1 | 8/2019 | Dejneka et al. |
| 2020/0002220 A1 | 1/2020 | Dejneka et al. |
| 2020/0255325 A1 | 8/2020 | Dejneka et al. |
| 2020/0255327 A1 | 8/2020 | Dejneka et al. |
| 2020/0399167 A1 | 12/2020 | Dejneka et al. |
| 2021/0070018 A1 | 3/2021 | Dejneka et al. |
| 2022/0009823 A1 | 1/2022 | Dejneka et al. |
| 2022/0162114 A1 | 5/2022 | Dejneka et al. |

FOREIGN PATENT DOCUMENTS

| | | |
|---|---|---|
| WO | 2019/051408 A2 | 3/2019 |
| WO | 2020/106486 A1 | 5/2020 |

ARTICLES INCLUDING GLASS AND/OR GLASS-CERAMIC AND METHODS OF MAKING THE SAME

CROSS-REFERENCE TO RELATED APPLICATIONS

This application claims the benefit of priority under 35 U.S.C. § 371 of International Application No. PCT/US2022/026278, filed on Apr. 26, 2022, which claims the benefit of priority under 35 U.S.C. § 119 of U.S. Provisional Application No. 63/183,161, filed May 3, 2021, the content of which are incorporated herein by reference in their entirety.

FIELD

The present disclosure generally relates to articles including glass-ceramics.

BACKGROUND

Glazing, such as for vehicles, may involve many different materials with different properties being bonded to one another in composite structures to satisfy needs of the vehicle. For example, automobile windshields must be strong enough to weather forces of the environment during travel, such as rain, hail, debris, and winds. The same windshields must block or absorb spectra of light that may damage interior componentry or cause discomfort to vehicle occupants. Coatings and materials may be integrated in interlayers between glass plies of a laminate that forms the windshield. If, for aesthetic or functional reasons, regions of the windshield are designed to be free of the coatings and materials or to be painted or decorated, then the windshield may require additional layers, or cutouts of layers. Construction of the combined structure can be expensive and time-consuming. Other glazing for vehicles may also be complicated and challenging to construct efficiently, such as sunroofs, windows, interior paneling, componentry, and cover glass. Architectural glazing and interior vehicle or other forms of glazing may experience similar challenges. A need exists for more efficient glazing.

SUMMARY OF THE PRESENT DISCLOSURE

A single, continuous sheet or ply of glass-ceramic material, as discussed herein, may be processed to have discrete regions, where one region allows for sufficient transmission of visible light but simultaneously controls ultraviolet and/or infrared transmission, while another smaller region allows for transmission of infrared, such as to permit communication of signals or measurements transmitted in the infrared. The sheet may further include a third region of the same glass-ceramic material that is instead processed to have desired coloration for decorations of the sheet, such as colored borders adjacent to edges of the sheet.

According to some embodiments of the present disclosure, glazing includes a sheet of glass-ceramic. The glass-ceramic has a silicate amorphous phase and a crystalline phase with precipitates of formula $M_xWO_3$ and/or $M_xMoO_3$, where $0<x<1$ and M is a dopant cation selected from the group consisting of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, Ti, V, Cr, Mn, Fe, Ni, Cu, Pd, Se, Ta, Bi, and Ce. The sheet is at least 0.5 millimeters thick and the glass-ceramic has less than 200 parts per million iron content. The sheet includes first, second, and third regions that are discrete from one another with respect to location on the sheet, but attributes characteristic of the regions may transition into one another at respective borders thereof on the sheet.

The first region has the $M_xWO_3$ and/or $M_xMoO_3$ precipitates at a volume fraction of the glass-ceramic greater than 1% and less than 20% and homogenously distributed within the silicate amorphous phase. At least in part due to the precipitates, the first region has transmittance of at least 70% over a 100 nanometer-wide band at wavelengths in a range between 380 to 750 nanometers and less than 50% at wavelengths between 900 nanometers to 1800 nanometers. The second region has less than half the volume fraction of $M_xWO_3$ and/or $M_xMoO_3$ precipitates of the first region. Accordingly, the second region has transmittance of at least 80% over a 100 nanometer-wide band at wavelengths in a range between 900 nanometers to 1800 nanometers. The third region has essentially the same volume fraction and distribution of the $M_xWO_3$ and/or $M_xMoO_3$ precipitates as the first region, but with different stoichiometry with respect to the dopant cation M and concentration x. At least partially as a result of that stoichiometry difference, the third region has transmittance of less than 40% at wavelengths between 380 to 750 nanometers.

In some embodiments, the first region has greater surface area of the sheet than the second region, such as at least ten times greater surface area of the sheet than the second region. In some embodiments, the third region frames the first region. According to an exemplary embodiment, the third region adjoins edges of the sheet. In some embodiments, the second region transmits a greater average percentage than the first region at wavelengths in a range between 380 to 750 nanometers, such as at least 5% greater.

According to an exemplary embodiment, the sheet of glass-ceramic is a first sheet of the glazing, and the glazing further includes a second sheet and an interlayer between the first sheet and the second sheet. In some such embodiments, the second sheet is thicker than the first sheet. The second sheet may be amorphous glass, which may be strengthened such that an interior of the second sheet is in tension while exterior surfaces of the second sheet are in compression. Material of the interlayer may be polymeric. However, in some embodiments, both the second sheet and the interlayer have transmittance of at least 80% at most wavelengths between 380 to 750 nanometers and at least 80% over a 100 nanometer-wide band in a range between 900 nanometers to 1800 nanaometers.

According to an exemplary embodiment, the third region of the sheet of glass-ceramic of the glazing appears colored, while the first and second regions appear clear. The second region may appear clearer than the first region.

According to some embodiments of the present disclosure, a method of making glazing includes steps of heating first and third regions of a sheet of glass-ceramic to different temperatures, such that the difference is at least 50° C., and focusing energy on a second region of a sheet of glass-ceramic. The glass-ceramic has a silicate amorphous phase and a crystalline phase having precipitates of formula $M_xWO_3$ and/or $M_xMoO_3$, where $0<x<1$ and M is a dopant cation selected from the group consisting of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, Ti, V, Cr, Mn, Fe, Ni, Cu, Pd, Se, Ta, Bi, and Ce. At least in part due to the heating and focusing steps, the second region has less than half the volume fraction of the $M_xWO_3$ and/or $M_xMoO_3$ precipitates of the first region, and the third region has essentially the same volume fraction and distribution of the $M_xWO_3$ and/or $M_xMoO_3$ precipitates as the first region but has different stoichiometry with respect to the dopant cation M and concentration x. For at least one dopant cation of the group, concentration x of that at least one dopant cation differs between the first and third regions at least by a factor of 2.

In some embodiments, a laser focuses the energy on the second region and/or localized heat sources are used to heat the first and third regions to different temperatures. The process may further include sagging the sheet during the heating. In some embodiments, during the sagging, a second sheet is co-sagged and the sheet of glass-ceramic and the second sheet are coupled to one another by an interlayer. The second sheet and the interlayer both have transmittance of at least 80% over a 100 nanometer-wide band at wavelengths in a range between 380 nanometers to 1800 nanometers, which when overlaying the second region of the sheet of glass-ceramic, permit communication at infrared wavelength within the band.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE FIGURES

The accompanying Figures are included to provide a further understanding and are incorporated in and constitute a part of this specification. The drawings illustrate one or more embodiments, and together with the Detailed Description explain principles and operations of the various embodiments. As such, the disclosure will become more fully understood from the following Detailed Description, taken in conjunction with the accompanying Figures, in which.

DETAILED DESCRIPTION

Figure 1:
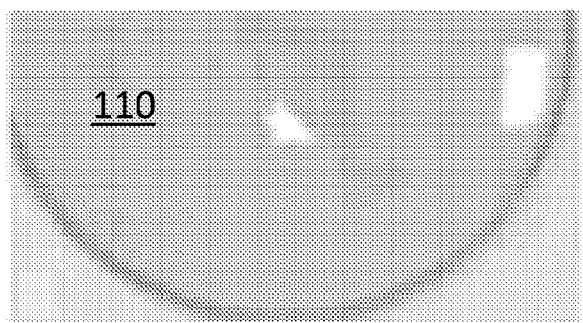
FIG. 1 is a digital photograph of a round, brownish-tinted, 2 mm thick glass-ceramic sample having tungsten-containing wavelength-dependent submicroscopic crystals.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Applicants previously invented precursor glasses that achieve a sufficient quantity of solubilized tungsten, molybdenum, titanium, and other metals to allow for formation of wavelength-dependent submicroscopic crystals or precipitates (e.g., $M_xWO_2$, where $0<x<1$ and M is a dopant, such as an alkali metal) through subsequent heat treatment and conversion of the glass into glass-ceramic (called "bronze" glass-ceramics, e.g., "tungsten bronze"). The crystals provide useful ultraviolet and/or infrared attenuation but allow transmission within the visible range, as the crystals are homogenously distributed throughout amorphous glassy phase of the glass-ceramic. Among other advancements with this technology, to overcome the so-called "solubility limit," Applicants discovered use of "bound alkalis," such as spodumenes, as batch constituents, where the bound alkalis prevent formation of dense alkali tungstate and opalizing of the glass-ceramic by delaying release of alkalis as temperatures rise during melting. For background, see generally U.S. Pat. No. 10,450,220 and 10,807,906 and U.S. Publications Nos. 2019/0177206 and 2020/0399167, each of which are incorporated by reference herein in their entireties.

Some embodiments of the present disclosure include glazing that includes a sheet of glass-ceramic, where the glass-ceramic has a silicate amorphous phase and a crystalline phase comprising precipitates (e.g., suboxides, crystals) of formula $M_xWO_3$ and/or $M_xMoO_3$, where $0<x<1$ and M is a dopant cation. The sheet includes first, second, and third regions, wherein at least parts of the regions are discrete from one another with respect to location on the sheet (see, e.g., sheet 310 and regions 312, 314, 316 of FIG. 4).

In some such embodiments, the dopant cation M is selected from the group consisting of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, Ti, V, Cr, Mn, Fe, Ni, Cu, Pd, Se, Ta, Bi, and Ce, or put another way, the dopant cation M may be any one or combination of the dopant cations in the group. In contemplated embodiments, the dopant cation may be other materials. Applicants note that small amounts of certain transition metals, including Ag, Cu, and Ag, as dopants cations M provide a wide range of coloring options for the glass-ceramics, which may be achieved by varying temperatures during heat treatment of the precursor glass and the corresponding glass-ceramics.

In some embodiments, the sheet is at least 200 μm thick (see, e.g., thickness T of sheet 412 in FIG. 6), such as that portions of the sheet are 200 μm thick, most of the sheet is 200 μm thick, nearly all (e.g., >90% of the volume) of the sheet has a thickness of 200 μm. In some embodiments, the sheet is at least 300 μm thick, such as at least 500 μm thick, such as at least 600 μm thick, such as even 700 μm thick, or thicker still, and/or no more than 3 cm thick, no more than 1 cm thick, such as no more than 5 mm thick, such as no more than 3 mm thick.

In other contemplated embodiments, the sheet is less than 200 μm thick, such as between 20 μm up to 200 μm. However, large sheets, such as with surface areas greater than 1 m² may be difficult to handle when such large sheets are particularly thin, so laminates (e.g., glass-polymer or glass-glass) may be used to buttress such thin sheets. In other contemplated embodiments, the sheet may be thicker than 3 cm, but greater thicknesses may generally require more refined batch constituent materials to control impurities that could influence optical properties of the corresponding glass-ceramics.

Applicants find that iron content of the glass-ceramic influences color options (e.g., brightness, L* of CIELAB) of the glass-ceramic and transmission of visible light (e.g., wavelengths between 380 to 750 nm) through the glass-ceramic. Lesser concentrations of iron in the precursor glass may improve optical qualities of the corresponding glass-ceramic. Such a finding was surprising because iron manifests as brownish coloration in the glass-ceramic, but one may typically expect iron to provide a bluish tint. Without being bound to any theory, Applicants believe that iron may have an affinity for influencing tungsten, and even in small amounts the iron has significant impact on color of resulting glass-ceramic.

Depending upon cost and availability of high-purity batch materials, synthetic bound alkalis, such as crushed glass-ceramic cullet of low-iron concentration, may be used as batch materials to introduce constituents into the mix, such as lithium, and accordingly reduce inadvertent inclusion of tramp or contaminate iron that may be in natural minerals, such as spodumene, or lower-cost batch materials.

Figure 2:
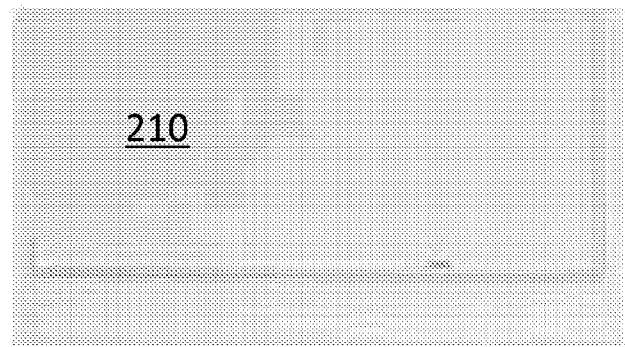
FIG. 2 is a digital photograph of another glass-ceramic, according to the present disclosure, with tungsten-containing wavelength-dependent submicroscopic crystals, where the glass is also 2 mm thick and set on the same surface as the glass-ceramic of FIG. 1, where the glass-ceramic of FIG. 2 differs from the glass-ceramic of FIG. 1 by having less iron.

Referring now to FIGS. 1-2, glass-ceramic 110 in FIG. 1 has iron concentration of approximately 0.02 mol %. The glass-ceramic 110 is about 2 mm thick and has a slight brownish tint, which Applicants attribute to the iron content. By contrast, glass-ceramic 210 in FIG. 2 has a similar composition and thickness, but with less iron.

According to an exemplary embodiment, the glass-ceramic, such as for glazing purposes at thicknesses disclosed herein (e.g., at least 0.5 mm), has less than 200 parts per million iron, such as less than 100 ppm, such as less than 50 ppm, such as less than 30 ppm. Iron content may be measured by inductively coupled plasma spectroscopy.

Table 1 includes several example precursor glasses, with and without lithium, that are particularly useful for embodiments disclosed herein, such as for glazing.

TABLE 1

| constituents | Example 1 (mol %) | Example 2 (mol %) | Example 3 (mol %) | Example 4 (mol %) |
|---|---|---|---|---|
| $SiO_2$ | 65.75 | 65.43 | 68.14 | 68.14 |
| $Al_2O_3$ | 9.79 | 9.74 | 9.66 | 9.61 |
| $B_2O_3$ | 11.01 | 11.04 | 8.75 | 8.78 |
| $Li_2O$ | 0 | 0 | 5.38 | 5.34 |
| $Na_2O$ | 8.19 | 8.27 | 4.76 | 4.78 |
| $K_2O$ | 1.67 | 1.68 | 0.01 | 0.08 |
| $SnO_2$ | 0.11 | 0.1 | 0.1 | 0.12 |
| $WO_3$ | 3.36 | 3.37 | 2.87 | 2.8 |
| CaO | 0.11 | 0.1 | 0.16 | 0.18 |
| Ag | 0 | 0.22 | 0 | 0.15 |
| $ZrO_2$ | 0 | 0 | 0.06 | 0.05 |
| $Fe_2O_3$ | 0.001 | 0.0009 | 0.002 | 0.002 |

The examples in Table 1 are useful for glazing due to combined benefits of optical qualities in the visible range, such as due to low iron; a broad range of color-ability, such as due to silver content; and fusion draw compatibility. However, other glass-ceramic compositions may be used to achieve the glazing disclosed herein and may include $M_xWO_3$ and/or $M_xMoO_3$ precipitates or titanium bronze or vanadium bronze or other glass-ceramics.

Heat treatment may be used to convert the precursor glasses, such as those glasses of Table 1, to glass-ceramics with $M_xWO_3$ and/or $M_xMoO_3$ precipitates that in turn limit transmission of infrared and/or ultraviolet light while still permitting high visible transmittance. The process of heat treatment includes a "dwell" time and "peak" temperature that depend on composition and target thickness. Applicants note that the dwell may be in aggregate if multiple shorter cycles are use, and the peak may be generally within a bounded high temperature range. Unless otherwise specified, as used herein, "transmission", "transmittance", "optical transmittance" and "total transmittance" are used interchangeably and refer to external transmission or transmittance, which takes absorption, scattering, and reflection into consideration. Fresnel reflection is not subtracted out of the transmission and transmittance.

Figure 11:
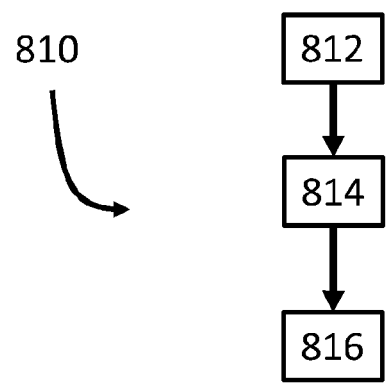
FIG. 11 is a flowchart of process steps according to the present disclosure.

According to an exemplary embodiment, referring to FIG. 11, a process 810 of heat treatment generally includes a step of ramping 812 of the temperature of precursor glass, such as from a first temperature (e.g., room temperature, temperature below 400° C.) at a rate generally between 5° C. to 25° C. per minute to a second temperature. Applicants find ramping rate is not particularly controlling, such as for particular color generation for example. The ramping rate may change, such as being reduced near peak temperatures.

According to an exemplary embodiment, the heat treatment process may include generally holding 814 within temperatures, such as between 475° C. and 605° C., such as between 515° C. and 550° C., for an aggregate time, typically more than 5 minutes, such as more than 10 minutes, such as ranging from 15 minutes to 75 minutes.

According to an exemplary embodiment, the heat treatment process includes cooling 816 to a temperature, such as below the peak temperatures by at least 10° C., such as between 475° C. and 425° C. at a slow rate, such as a rate of about 1° C./minute (e.g., 0.1° C./minute up to 5° C./minute). Below these temperatures, the cooling rate can be increased to 5 to 10° C. per minute, as this faster cooling rate is not particularly controlling for attributes, such as color.

Any of these steps 812, 814, 816 may be changed or modified, such as to change precipitate concentrations or volume fractions of intercalated dopants, coloring, optical properties, etc., such as ramping 812 at two separate rates, such as with a slower second rate beginning above 450° C., for example, where slower ramp rate may help prevent the furnace from over-shooting the peak target temperature(s).

Figure 3:
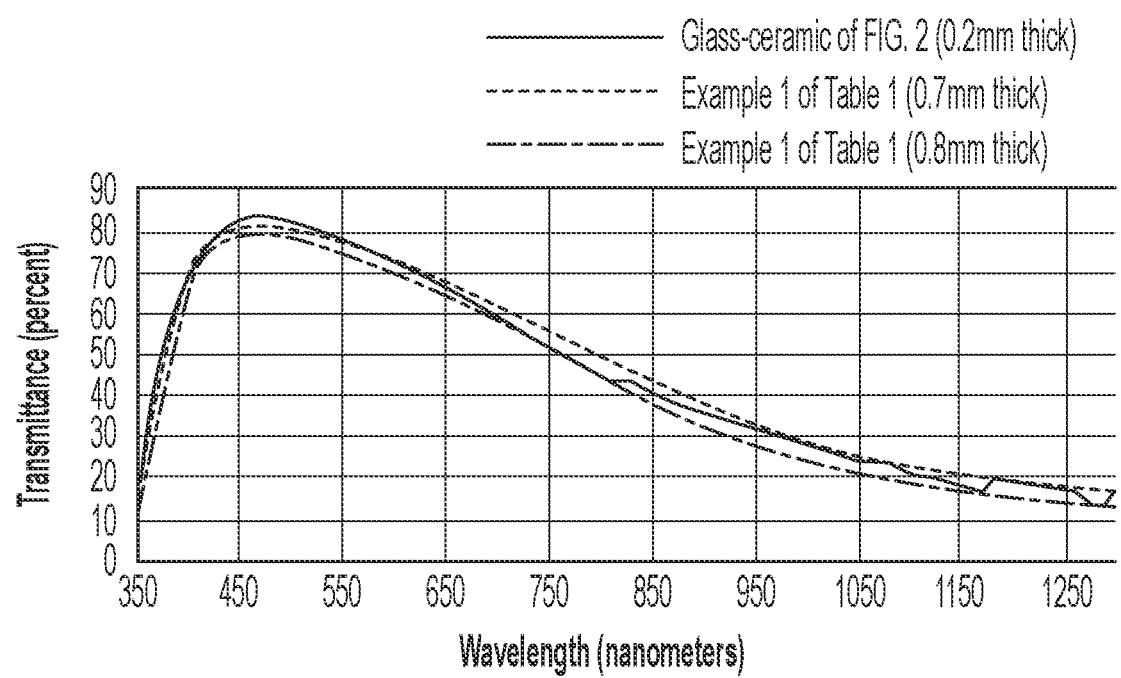
FIG. 3 is a plot of percent transmission (Y-axis) at different wavelengths (X-axis) for glass-ceramics with tungsten-containing wavelength-dependent submicroscopic crystals, one glass-ceramic of which is the glass-ceramic composition of FIG. 2 but at 0.2 mm thick.

The precursor glass in FIG. 2, in terms of constituent mol %, includes 56.686 $SiO_2$, 13.771 $Al_2O_3$, 9.215 $B_2O_3$, 3.840 $Na_2O$, 2.099 $K_2O$, 1.614 $Li_2O$, 0.204 $SnO_2$, 12.526 $WO_3$, 0.012 $Fe_2O_3$, 0.004 CaO, 0.001 $SO_3$, 0.000 $Cl^-$, 0.000 (O=Cl), 0.000 $As_2O_3$, 0.011 $TiO_2$, 0.017 MgO. A heat treatment thermal cycle on this precursor glass was used to produce the glass-ceramic of FIG. 2, which included steps of ramping precursor glass to 530° C. at 10° C. per minute, ramping to 550° C. at 2° C. per minute, holding for 10 minutes, cooling to room temperature at about 2.66° C. per minute. FIG. 3, shows corresponding transmission behavior of the glass-ceramic of FIG. 2 as the solid line.

In other embodiments, heat treatment cycles may include, for example, steps ramping to 525° C. at 10° C./min, holding at 525° C. for 22.5 min, cooling to 450° C. at 1° C./min, then cooling from 450° C. to room temperature at approximately 2.66° C./min. Another example includes ramping to 520° C. at 10° C./min, ramping to 550° C. at 2° C./min, holding at 550° C. for 60 min, cooling to 475° C. at 1° C./min, and then cooling from 475° C. to room temperature at approximately 2.66° C./min. Another example includes ramping to 510° C. at 10° C./min, ramping to 540° C. at 2° C./min, holding at 540° C. for 30 min, cool to 475° C. at 1° C./min, cooling from 475° C. to room temperature at approximately 2.66° C./min.

The glasses listed as Example 1 to 4 in Table 1 have roughly an order of magnitude less iron than the relatively clear glass-ceramic shown in FIG. 2. The transmission behavior of Example 1 of Table 1 is shown as the dashed and dotted lines in FIG. 3, which at first glance appear similar to the transmission behavior of the sample of FIG. 2. However, the dashed and dotted lines correspond to 0.7 mm and 0.8 mm thick samples of the glass-ceramic of Example 1, more than three times thicker than the relatively clear sample shown in FIG. 2!Similar transmission behavior occurs for the other Examples.

Notably silver content as shown in Examples 2 and 4, or other transition metals as disclosed herein (e.g., gold, copper), may be useful for providing coloring, such as for regions of decorations on a sheet of glass-ceramic, instead of using paint or colored frit glass. Using the glass-ceramics discussed herein, the regions of decorations may instead be achieved by different peak and/or elevated hold temperatures of different regions of the respective article. For example, a colored region ramped to a peak temperature and/or held at an elevated temperature for crystal growth that is at least 10° C. greater than another region, such as a clear region or region of different color, such as at least 30° C. greater, at least 50° C. greater.

According to some embodiments, temperature differentials during heat treatment processes may be achieved by applying localized heat sources (e.g., clamp-on resistive heaters, focused hot air, etc.) to the higher temperature regions. Additionally in some such embodiments, or alternatively in other embodiments, heat sinks (e.g., heat conductive surface at lower temperature, cooling air) and/or heat shields (e.g., blanket, coatings) may be applied to the lower temperature region for example.

Figure 4:
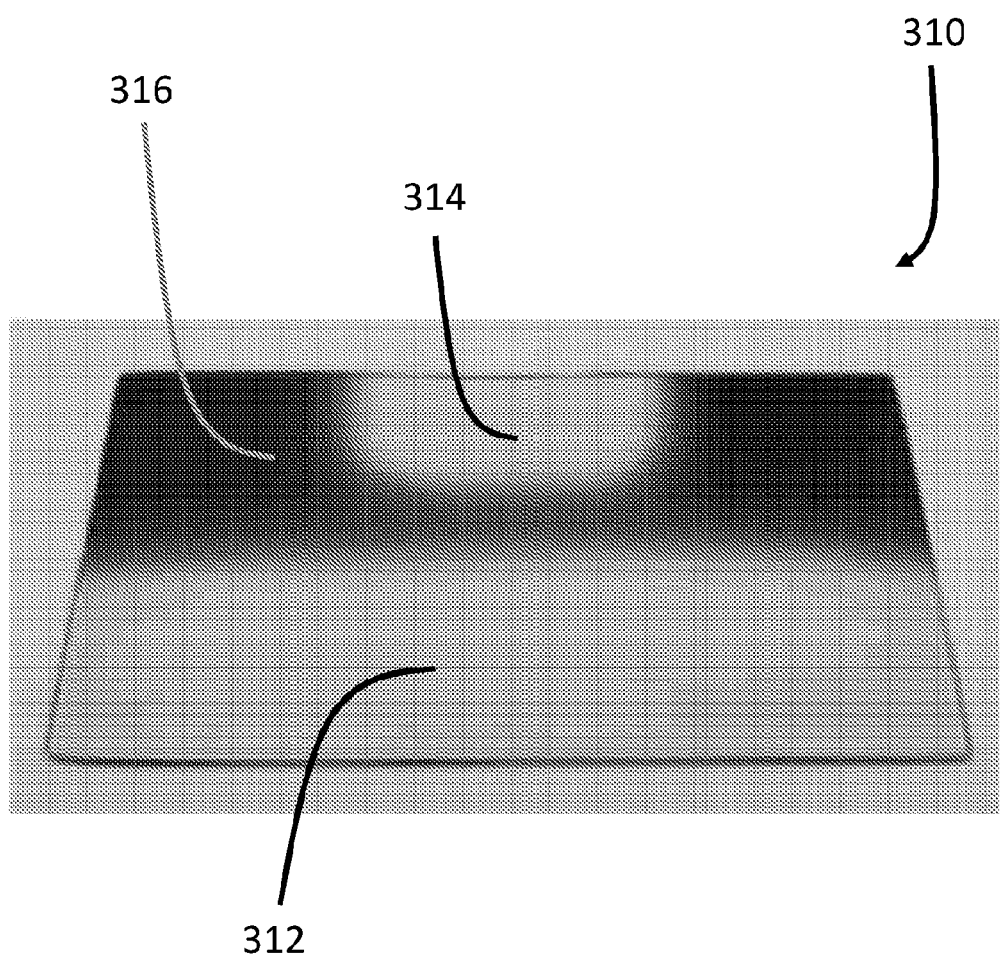
FIG. 4 is a digital photograph of a single, continuous sheet of glass-ceramic having different, discrete regions with respect to location on the sheet, according to the present disclosure.

Referring to FIG. 4, a glass-ceramic sheet 310 includes a first region 312, a second region 314, and a third region 316. Color differences between at least the first region 312 and the third region 316 were achieved by the above-described heat treatment process steps, including controlling peak and/or hold temperatures to be different from one another in the first and third regions 312, 316.

The second region 314 appears to be the same color (or similarly transparent) as the first region 312. In some such embodiments, the third region 316 may be locally processed with sufficient energy to diffuse some, most, or all precipitates of formula $M_xWO_3$ and/or $M_xMoO_3$ in the third region 316. Accordingly, while the third and first regions appear similar to one another to the naked eye, the third region may allow transmission of infrared wavelengths that would be stopped (e.g., absorbed, reflected) by the first region 312.

Figure 5:
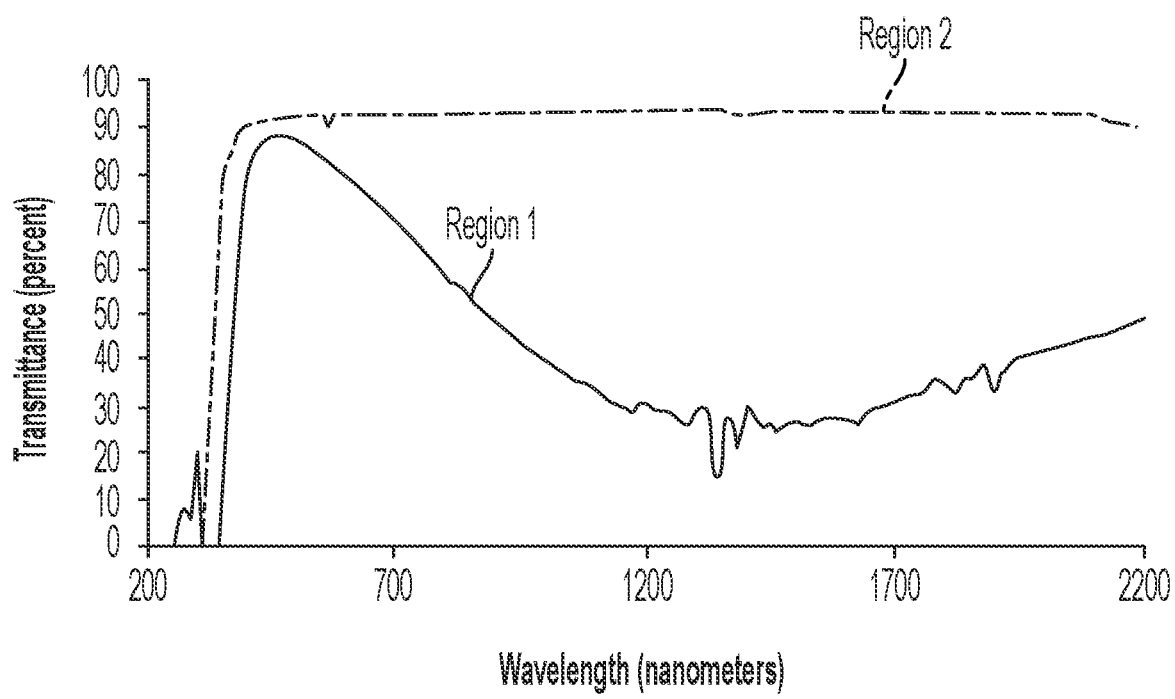
FIG. 5 is a plot of percent transmission (Y-axis) at different wavelengths (X-axis) for glass-ceramic in regions with and without submicroscopic crystals, according to the present disclosure.

Referring to FIG. 5, transmission spectra compares glass-ceramic with $M_xWO_3$ and/or $M_xMoO_3$ crystals, representative of Region 1, and with the crystals removed, representative of Region 2. As shown, precipitates of formula $M_xWO_3$ and/or $M_xMoO_3$ in Region 1, limit transmission, particularly at wavelengths greater than 750 nanometers. While Region 2, with fewer or none of the precipitates, correspondingly allows greater transmission than Region 1, especially for wavelengths in the infrared between 750 to 2200 nanometers.

Figure 6:
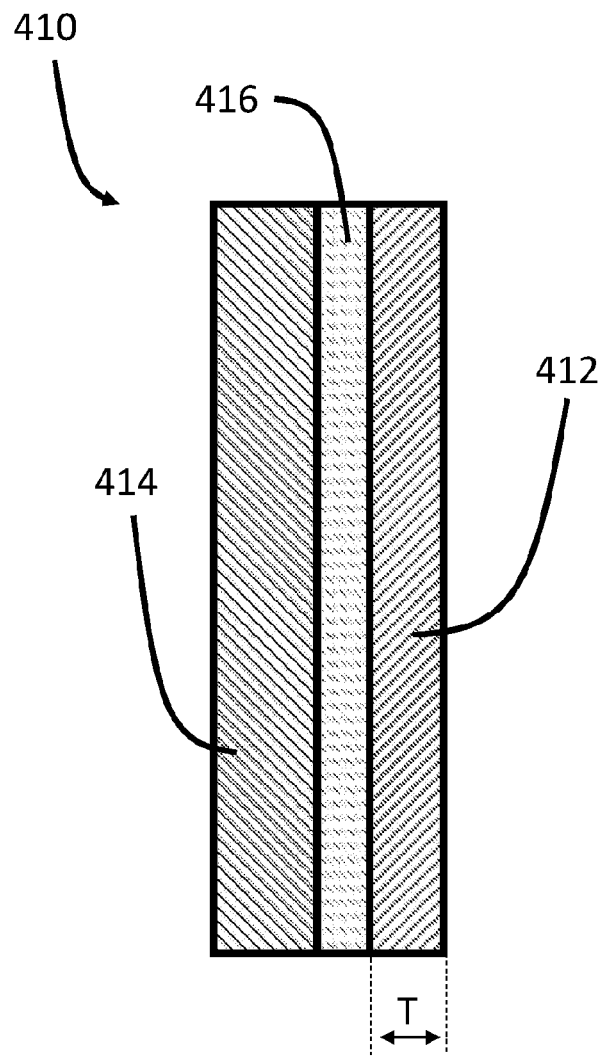
FIG. 6 is a side view of an article including glass-ceramic, according to the present disclosure.

Referring now to FIG. 6, in some embodiments, glasses and glass-ceramics discussed herein may be integrated into composite articles, such as laminates. As shown in FIG. 6, an assembly 410 includes a sheet 412 of glass-ceramic, a second sheet 414, and an interlayer 416. The second sheet 414 may be glass, such as amorphous glass, and the second sheet 414 may be strengthened, such as by heat tempering or chemical tempering, to achieve compression on exterior surfaces of the second sheet 414, offset by tension therewithin. In some embodiments, the sheet 412 of glass-ceramic may also be similarly strengthened. In some embodiments, the interlayer is a polymer (e.g., a polyvinyl butyral, such as clear acoustic polyvinyl butyral, Saflex® Acoustic PVB), such as an adhesive, that couples together the first and second sheets 412, 414.

Figure 7:
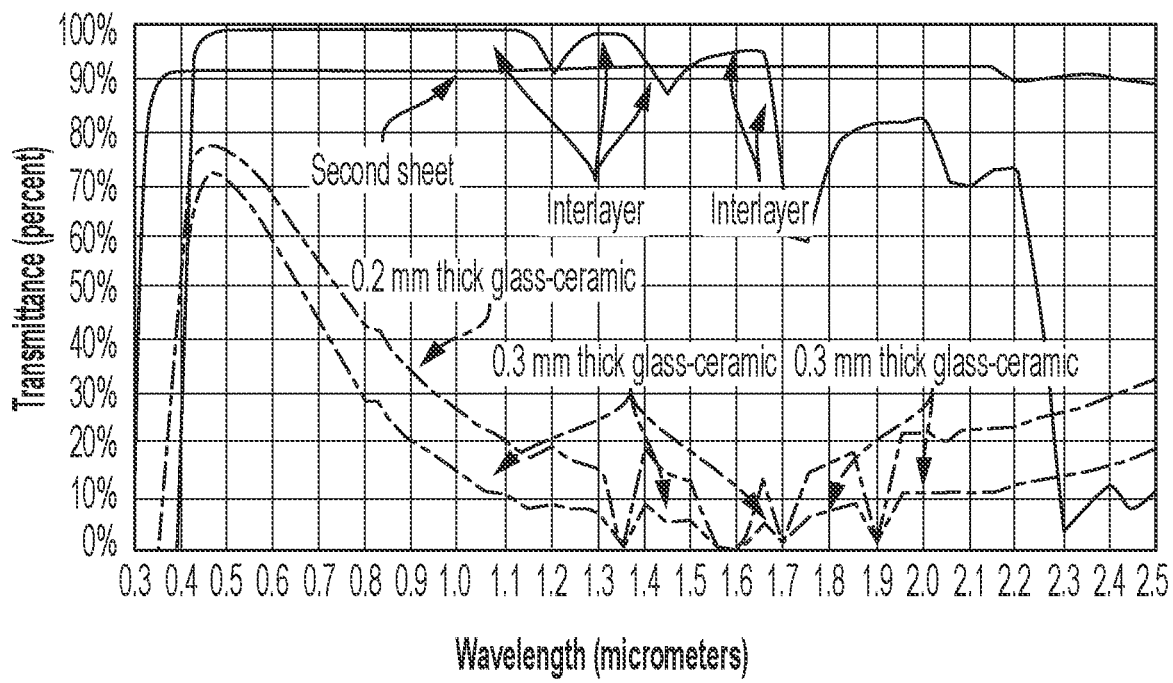
FIG. 7 is a plot of percent transmission (Y-axis) at different wavelengths (X-axis) for materials of an article as disclosed in FIG. 5, including glass-ceramics of two different thicknesses of glass-ceramic for comparative purposes.

Referring to FIG. 7, transmission spectra are shown, which are representative of the sheet 412, the second sheet 414, and the interlayer 416 of the assembly 410. The second sheet 414 and the interlayer 416 both have particularly high transmission in some, most, or all of the visible range of about 380 nm to 750 nm, such as above 80%, such as above 90%. Similarly, the second sheet 414 and the interlayer 416 both have high transmission in the near infrared, such as between 750 nm to 2500 nm (and presumably higher, such as up to 1 mm) wavelengths.

Those of skill in the art may find these spectra of FIG. 7 surprising because for many, most, or all such articles 410 intended for UV/IR-controlled glazing, ultraviolet and/or infrared management may be integrated with the interlayer, such as in the form of organic materials in the interlayer, or as coatings. Accordingly, the interlayer or coatings may produce different transmission spectra for the second sheet 414 or interlayer 416, for example. By contrast, as shown in FIG. 7, ultraviolet and/or infrared management of the article 410 is mostly provided by the sheet 412 of glass-ceramic.

Figure 8:
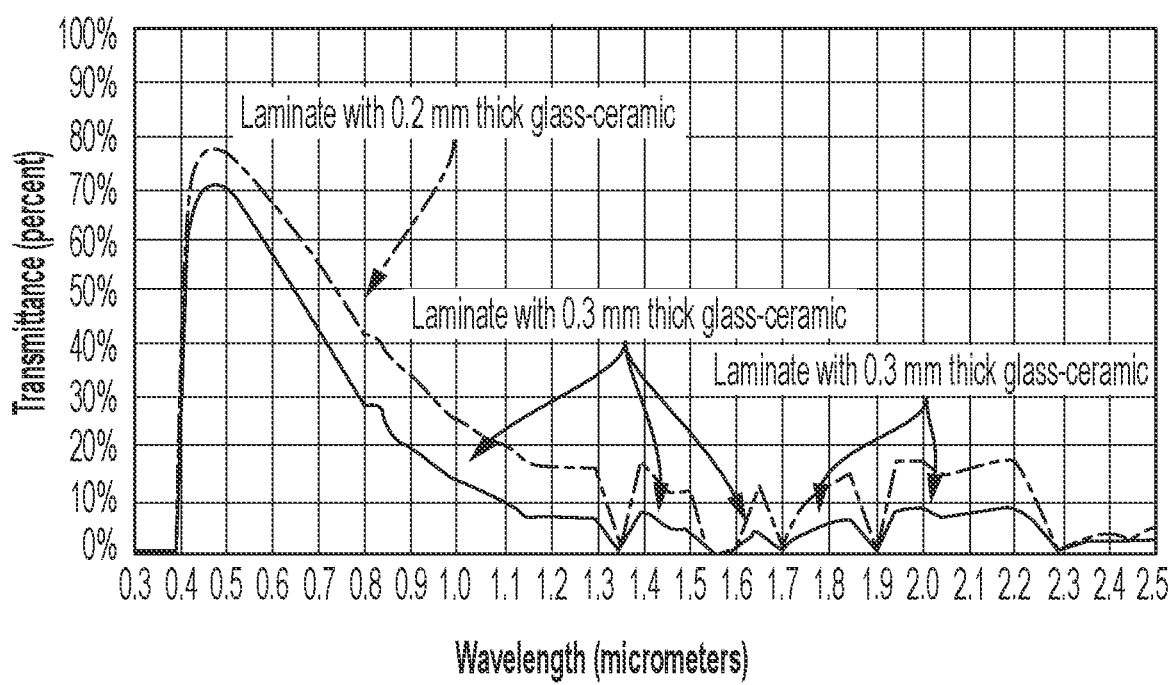
FIG. 8 is a plot of percent transmission (Y-axis) at different wavelengths (X-axis) of the corresponding combined articles of FIG. 7 with each of the two glass-ceramic thicknesses.

Also as shown in FIG. 7, thickness of the glass-ceramic layers influences the transmission properties of the respective layers. The thinner layer (0.2 mm) allows for greater transmission in the visible and infrared than the thicker layer (0.3 mm). However, as explained above, thickness T (see FIG. 6) of the sheet 412 of glass-ceramic may be increased without losing transmission in the visible range, such as by using low-iron constituents for example, such as with glass-ceramics from the precursor glasses of Table 1. FIG. 8 shows that the aggregate transmission of the article 410 is essentially a superposition of layers.

Figure 9:
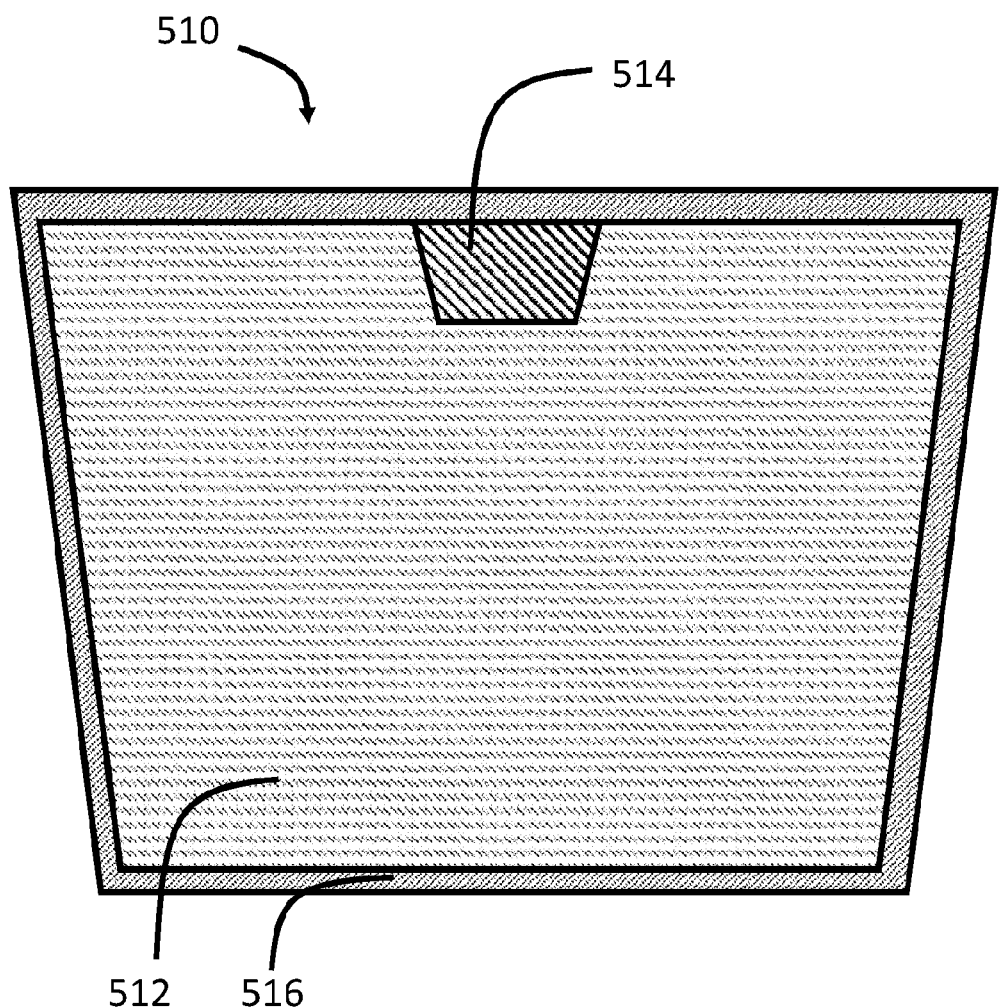
FIG. 9 is a front view of glazing with different regions, according to the present disclosure.

Referring now to FIG. 9, according to an exemplary embodiment, a sheet 510 includes first, second, and third regions 512, 514, 516 discrete from one another with respect to location on the sheet. The first and third regions 512, 516 have the $M_xWO_3$ and/or $M_xMoO_3$ precipitates at a volume fraction of the glass-ceramic greater than 0.001%, such as greater than 0.1%, such as greater than 1%, such as greater than 1.5%, such as greater than 2.0% and/or less than 80%, such as less than 50%, such as less than 30%, such as less than 20%. In some such embodiments, the $M_xWO_3$ and/or $M_xMoO_3$ precipitates of first and third regions 512, 516 are homogenously distributed within the silicate amorphous phase of the glass-ceramic such that the precipitates are fairly evenly dispersed throughout the silicate amorphous phase, as opposed to opalize.

In some embodiments, the third region 516 has essentially the same volume fraction (e.g., within 5%) and distribution of the $M_xWO_3$ and/or $M_xMoO_3$ precipitates as the first region 512. However, the third region 516 has different stoichiometry with respect to the dopant cation M and concentration x. In some such embodiments, for at least one dopant cation of the above-described group (e.g., a transition metal, such as Au, Cu, Ag), concentration x of that at least one dopant cation differs between the first and third regions 512, 516 at least by a factor of 1.5, such as 2, such as 3, such as 10, and/or where concentration x of that at least one dopant differs between the first and third regions 512, 516 by a difference in value of x being at least 0.001, such as 0.01, such as 0.05.

This difference in dopant cation M and concentration x may be achieved by heating the first and third regions to different temperatures, as discussed above, such as during a process of heat treatment of the glass-ceramic of the sheet 510, such as where a temperature difference of the first and third regions 512, 516 is at least 10° C., such as at least 50° C., at least 70° C.

In some embodiments, the second region 514 has less than half the volume fraction of the $M_xWO_3$ and/or $M_xMoO_3$ precipitates (i.e. volume fraction of the sum of all $M_xWO_3$ and $M_xMoO_3$ precipitates present) of the first region 512, such as less than a third, a tenth, a hundredth. In the second region 512, the $M_xWO_3$ and/or $M_xMoO_3$ precipitates may be essentially erased or removed from the glass-ceramic, such as by directing or focusing energy into the second region, such as by laser or other energy sources, until the concentration of precipitates is correspondingly reduced and constituents disperse within the amorphous phase of the glass-ceramic in the second region. Conceivably, localized heat sources and sinks can be used to prevent initiation or growth of crystals in the second region 514 during heat treatment, whereby the crystals would not then need to be removed. In some embodiments, the second region 512 may be mostly or essentially amorphous glass.

As may be intuitive and as shown in the example of FIG. 4, the regions 312, 314, 316 may be distinct and discrete with respect to location on the sheet 310, but may gradually transition at borders between the regions 312, 314, 316, where there may be a transition of transmission properties. Sharpness of borders between regions 312, 314, 316 may be controlled by temperature control during heat treatment and use of focused energy.

Referring again to FIG. 9, according to an exemplary embodiment, the first region 512 has transmittance of at least 50%, such as at least 60%, such as at least 70%, such as at least 75%, such as at least 80% over some, most, or all of a 50 nanometer-wide band, such as a 100 nanometer-wide band, such as a 200 nanometer-wide band, such as fully across wavelengths in a range between 380 to 750 nanometers, corresponding to appearing clear. As mentioned above, Applicants believe that low-Fe (e.g., <100 ppm) embodiments of the glass-ceramic allow for such transmittance, especially at greater thicknesses, such as at least 200 μm, such as at least 300 μm, or greater thicknesses, as disclosed above.

However, at least in part due to the $M_xWO_3$ and/or $M_xMoO_3$ precipitates, the first region 512 may have transmittance less than 50% over some, most, or all of a 50 nanometer-wide band, such as a 100 nanometer-wide band, such as a 200 nanometer-wide band, such as fully across wavelengths in the near infrared, such as >750 nm to about 1 mm wavelengths, such as between a first wavelength, such as 750, 800, and/or 900 nanometers, to a second wavelength, such as 1800, 2000, 2200, and/or 2500 nanometers.

According to an exemplary embodiment, the second region 514 has transmittance of at least 50%, such as at least 60%, such as at least 70%, such as at least 80%, such as at least 90% over some, most, or all of a 50 nanometer-wide band, such as a 100 nanometer-wide band, such as a 200 nanometer-wide band, a 500 nanometer-wide band, a micrometer-wide band, such as fully across wavelengths in the near infrared, such as >750 nm to about 1 mm wavelengths, such as between 900 nanometers to 1800 nanometers, allowing for signals and measurements in through the second region communicated in the near infrared. As disclosed herein, volume fraction of precipitates in the second region 514 may be less (e.g., 50% less, 80% less, 99% less) than the first region 512, thus interfering less with communications at corresponding infrared wavelengths.

According to an exemplary embodiment, the second region 514 has transmittance of at least 50%, such as at least 60%, such as at least 70%, such as at least 75%, such as at least 80% over some, most, or all of a 50 nanometer-wide band, such as a 100 nanometer-wide band, such as a 200 nanometer-wide band, such as fully across wavelengths in a range between 380 to 750 nanometers, corresponding to clear appearance. Due to fewer $M_xWO_3$ and/or $M_xMoO_3$ precipitates, the second region 514 may even appear clearer than the first region 512, such as allowing for 5% greater average transmission in a range between 380 to 750 nanometers relative to the first region 512 in some embodiments.

According to an exemplary embodiment, the third region 516 has essentially the same volume fraction and distribution of the $M_xWO_3$ and/or $M_xMoO_3$ precipitates as the first region 512, but with different stoichiometry with respect to the dopant cation M and concentration x of the $M_xWO_3$ and/or $M_xMoO_3$ precipitates. The stoichiometry can be changed by thermal treatment of the sheet, such as by using shielding to keep the first region 512 at a lower temperature than the third region 516, or by focusing heat on the third region 516, such as by use of localized heaters.

In some embodiments, the third region 516 appears colored and is opaque, or at least has less transmission of visible light than the first region 512. According to an exemplary embodiment, the third region 516 also has transmittance of less than 50%, such as no more than 40%, such as no more than 35%, such as no more than 30% over some, most, or all of a 50 nanometer-wide band, such as a 100 nanometer-wide band, such as a 200 nanometer-wide band, such as fully across wavelengths in a range between 380 to 750 nanometers, corresponding to appearing hazy or even opaque.

Applicants believe that low-Fe (e.g., <100 ppm) embodiments of the glass-ceramic facilitate bright colors of the glass-ceramic in the third region, such as CIELAB color coordinate b* values exceeding 80, such as up to 100, at L* values of 60 or 70, for example, or a* values up to and above 45 at L* values of 70 or 80.

Figure 10:
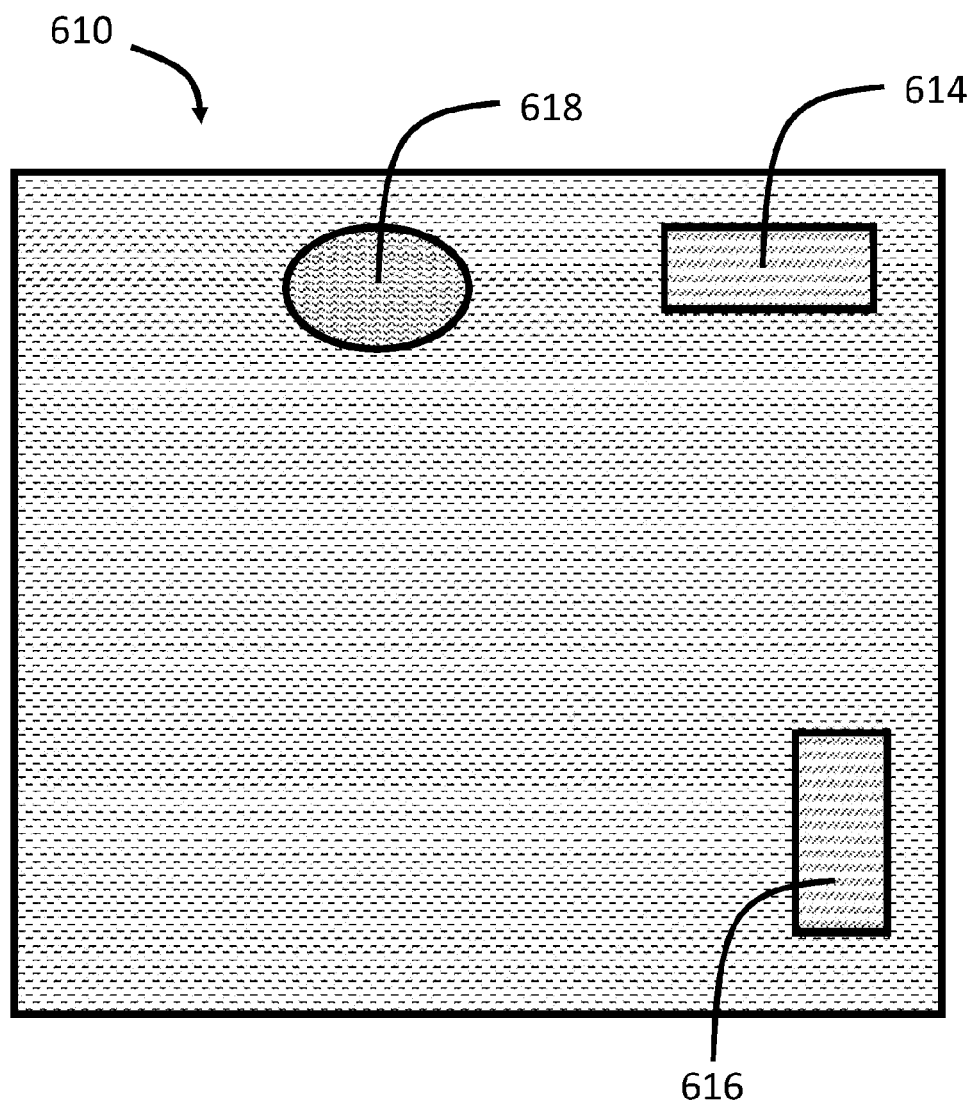
FIG. 10 is a front view of another form of glazing with different regions, according to the present disclosure.

Referring to FIG. 10, glazing includes a sheet 610 of glass-ceramic, as discussed herein, that includes regions 612, 614, 616, and 618. In contemplated embodiments, the region 612 is clear in the visible spectrum, similar to regions 312 and 512. In other contemplated embodiments, the regions 612 may be colored in the visible spectrum, similar to regions 316 and 516, or allow transmissions outside the visible spectrum, similar to regions 314, 514. Regions 614 and 616 may have the same transmission spectra as one another, which may differ from that of region 612 and 618, for example. In contemplated embodiments, 614 and 616 allow transmissions outside the visible spectrum, similar to regions 314, 514. Region 618 may be colored, similar to region 316 and 516. In contemplated embodiments, regions 612 and 618 may both be colored and/or partially transmissive in the visible spectrum, but may be differently colored.

Construction and arrangements of the compositions, structures, assemblies, and structures, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Materials, such as the glazing disclosed herein, may be used for glazing in architectural applications (e.g., windows, partitions) or may be otherwise used, such as in packaging (e.g., containers), such as to shield contents from certain wavelengths, as disclosed herein. Alternatively or in combination with tungsten bronze glass-ceramics, glazing or other structures disclosed herein may include molybdenum-bronze glass-ceramic, titanium bronze glass-ceramics, vanadium bronze glass-ceramics or other such glass-ceramics that include sub-oxide crystals that intercalate dopant cations. In some embodiments, sheets as disclosed herein (e.g., sheets 310, 510) may include some of the regions (e.g., 312, 314, 512, 516) discussed with respect to the sheets, but not others (e.g., 316, 514) and/or multiple discrete regions of the same type (e.g., several discrete 312, 314, 316). The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A glazing, comprising:
a sheet of glass-ceramic, the glass-ceramic having a silicate amorphous phase and a crystalline phase comprising precipitates of formula $M_xWO_3$ and/or $M_xMoO_3$, where $0<x<1$ and M is a dopant cation selected from the group consisting of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, Ti, V, Cr, Mn, Fe, Ni, Cu, Pd, Se, Ta, Bi, and Ce;
wherein the sheet is at least 0.5 millimeters thick;
wherein the glass-ceramic consists of less than 200 parts per million of iron;
wherein the sheet comprises first, second, and third regions discrete from one another with respect to location on the sheet,
wherein the first region has the $M_xWO_3$ and/or $M_xMoO_3$ precipitates at a volume fraction of the glass-ceramic greater than 1% and less than 20% and homogenously distributed within the silicate amorphous phase, wherein the first region has transmittance of at least 70% over a 100 nanometer-wide band at wavelengths in a range between 380 to 750 nanometers and less than 50% at wavelengths between 900 nanometers to 1800 nanometers,
wherein the second region has less than half the volume fraction of $M_xWO_3$ and/or $M_xMoO_3$ precipitates of the first region, wherein the second region has transmittance of at least 80% over a 100 nanometer-wide band at wavelengths in a range between 900 nanometers to 1800 nanometers, and
wherein the third region has essentially the same volume fraction and distribution of the $M_xWO_3$ and/or $M_xMoO_3$ precipitates as the first region but with different stoichiometry with respect to the dopant cation M and concentration x, wherein the third region has transmittance of less than 40% at wavelengths between 380 to 750 nanometers.

2. The glazing of claim 1, wherein the first region has greater surface area of the sheet than the second region.

3. The glazing of claim 2, wherein the first region has at least ten times greater surface area of the sheet than the second region.

4. The glazing of claim 3, wherein the third region frames the first region.

5. The glazing of claim 4, wherein the third region adjoins edges of the sheet.

6. The glazing of claim 1, wherein the second region transmits a greater average percentage than the first region at wavelengths in a range between 380 to 750 nanometers.

7. The glazing of claim 6, wherein the average percentage is at least 5% greater.

8. The glazing of claim 1, wherein the sheet of glass-ceramic is a first sheet, the glazing further comprising a second sheet and an interlayer between the first sheet and the second sheet, wherein the second sheet is thicker than the first sheet.

9. The glazing of claim 8, wherein the second sheet is amorphous glass.

10. The glazing of claim 9, wherein the amorphous glass is strengthened such that an interior of the second sheet is in tension while exterior surfaces of the second sheet are in compression.

11. The glazing of claim 9, wherein the interlayer comprises a polymeric material.

12. The glazing of claim 11, wherein both the second sheet and the interlayer have transmittance of at least 80% at most wavelengths between 380 to 750 nanometers and at least 80% over a 100 nanometer-wide band in a range between 900 nanometers to 1800 nanometers.

13. The glazing of claim 1, wherein the third region appears colored.

14. The glazing of claim 13, wherein the first and second regions appear clear.

15. The glazing of claim 14, wherein the second region appears clearer than the first region.

16. A method of making glazing, comprising:
heating first and third regions of a sheet of glass-ceramic to different temperatures, such that the difference is at least 50° C.;
focusing energy on a second region of a sheet of glass-ceramic;
wherein the glass-ceramic has a silicate amorphous phase and a crystalline phase comprising precipitates of formula $M_xWO_3$ and/or $M_xMoO_3$, where $0<x<1$ and M is a dopant cation selected from the group consisting of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, Ti, V, Cr, Mn, Fe, Ni, Cu, Pd, Se, Ta, Bi, and Ce;

wherein, at least in part due to the heating and focusing steps:

the second region has less than half the volume fraction of the $M_xWO_3$ and/or $M_xMoO_3$ precipitates of the first region, and wherein the third region has essentially the same volume fraction and distribution of the $M_xWO_3$ and/or $M_xMoO_3$ precipitates as the first region but with different stoichiometry with respect to the dopant cation M and concentration x such that, for at least one dopant cation of the group, concentration x of that at least one dopant cation differs in the first and third regions at least by a factor of 2.

17. The method of claim 16, wherein a laser focuses the energy on the second region.

18. The method of claim 16, wherein localized heat sources are used to heat the first and third regions to different temperatures.

19. The method of claim 16, further comprising sagging the sheet during the heating.

20. The method of claim 19, wherein during the sagging, a second sheet is co-sagged and the sheet of glass-ceramic and the second sheet are coupled to one another by an interlayer, wherein the second sheet and the interlayer both have a transmittance of at least 80% over a 100 nanometer-wide band at wavelengths in a range between 380 nanometers to 1800 nanometers.

* * * * *